(12) United States Patent
Fahlenkamp et al.

(10) Patent No.: US 10,727,751 B2
(45) Date of Patent: Jul. 28, 2020

(54) SWITCHED-MODE POWER SUPPLY WITH WAKE-UP CIRCUITRY

(71) Applicant: Infineon Technologies Austria AG, Villach (AT)

(72) Inventors: Marc Fahlenkamp, Geretsried (DE); Torsten Hinz, Augsburg (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/393,237

(22) Filed: Apr. 24, 2019

(65) Prior Publication Data

US 2019/0341852 A1    Nov. 7, 2019

(30) Foreign Application Priority Data

May 3, 2018   (DE) ................. 10 2018 110 665

(51) Int. Cl.
*H02M 3/335*   (2006.01)
*H02M 1/00*    (2006.01)

(52) U.S. Cl.
CPC ... *H02M 3/33507* (2013.01); *H02M 3/33515* (2013.01); *H02M 2001/0025* (2013.01); *H02M 2001/0035* (2013.01)

(58) Field of Classification Search
CPC ......... H02M 3/33507; H02M 3/33515; H02M 3/33523; H02M 2001/0025; H02M 2001/0035
See application file for complete search history.

(56) References Cited

U.S. PATENT DOCUMENTS

2011/0157924 A1   6/2011  Huynh
2013/0162157 A1*  6/2013  Suzuki .................. H02M 7/217
                                                315/201

(Continued)

FOREIGN PATENT DOCUMENTS

DE    102011005270 A1   12/2011
WO      WO0103279 A1    1/2001

OTHER PUBLICATIONS

Office Action, Application No. 10 2018 110 665.3, dated Nov. 22, 2018, pp. 5.

*Primary Examiner* — Fred E Finch, III
*Assistant Examiner* — Rafael O De León Domenech
(74) *Attorney, Agent, or Firm* — Armis IP Law, LLC

(57) ABSTRACT

A switched-mode power supply includes: a switching converter converts an input voltage into an output voltage in accordance with a switching signal, wherein the switching converter includes a transformer providing galvanic isolation between a primary side and a secondary side of the switching converter; and a wake-up circuit connected to the secondary side of the switching converter, the wake-up circuit coupled to the secondary side of the switching converter and operable to generate a feedback signal that indicates whether the output voltage is greater than or equal to a threshold value. A primary side regulator generates a control signal depending on a reference value and a measured value ($V_{AUX}$) representing the output voltage. Primary side logic generates the switching signal depending on the control signal. A tracking unit receives the feedback signal via a galvanically isolating component and adjusts the reference voltage based on the feedback signal.

29 Claims, 9 Drawing Sheets

(56) References Cited

U.S. PATENT DOCUMENTS

| | | |
|---|---|---|
| 2014/0092645 A1 | 4/2014 | Yang |
| 2014/0198535 A1 | 7/2014 | Yang et al. |
| 2014/0254215 A1 | 9/2014 | Brinlee et al. |
| 2014/0268924 A1* | 9/2014 | Tang ................ H02M 3/33507 363/21.17 |
| 2014/0313794 A1 | 10/2014 | Ono et al. |
| 2015/0055380 A1 | 2/2015 | Motoki |
| 2015/0229149 A1* | 8/2015 | Fahlenkamp ......... H02J 7/0044 320/114 |
| 2015/0229199 A1 | 8/2015 | Lu |
| 2015/0244274 A1* | 8/2015 | Fahlenkamp ..... H02M 3/33507 363/21.15 |
| 2016/0056724 A1 | 2/2016 | Valley et al. |
| 2016/0261198 A1 | 9/2016 | Li |
| 2016/0308452 A1 | 10/2016 | Motoki |
| 2017/0040820 A1 | 2/2017 | Ono |
| 2017/0099011 A1 | 4/2017 | Freeman et al. |
| 2017/0229968 A1 | 8/2017 | Valley et al. |
| 2017/0264204 A1 | 9/2017 | Motoki |
| 2018/0083544 A1 | 3/2018 | Yao et al. |

\* cited by examiner

SWITCHED-MODE POWER SUPPLY WITH WAKE-UP CIRCUITRY

RELATED APPLICATION

This application is related to and claims priority to earlier filed German patent application serial number 10 2018 110665.3 entitled "SWITCHED-MODE POWER SUPPLY,", filed on May 3, 2018, the entire teachings of which are incorporated herein by this reference.

TECHNICAL FIELD

The present description relates to the field of switching converters and switched-mode power supplies (SMPS).

INTRODUCTION

There are various concepts for regulating switching converters, such as for example what are known as flyback converters. In general, feedback of the output voltage of the switching converter to the controller that controls the switching operation (switching controller) is used to regulate the output voltage. In the case of a galvanically isolating switching converter topology, such as for example a flyback topology, a distinction may be drawn between primary side regulated (PSR) and secondary side regulated (SSR) switching converters. In the case of a secondary side regulated switching converter, a measured value for the output voltage is tapped off at the secondary side and at least part of the regulator is situated on the secondary side of the galvanic isolation (for example a transformer). In this case, the signal that is fed back (for example the output signal of the secondary side regulator) must likewise be transmitted to the controller on the primary side via a galvanically isolating component (for example an optocoupler or an integrated coreless transformer).

A "conventional" secondary side regulator is implemented by way of analog components, components having low tolerances generally being required for such an implementation in order to achieve the desired regulator characteristic. Furthermore, in what is known as the burst mode, there may be comparatively high ripple on the output voltage due to saturation effects (for example in the optocoupler). In standby mode, the secondary side regulator causes additional quiescent current, which increases standby power consumption.

When using primary side regulation, a digital regulator may be implemented in the controller, which regulator is generally more robust with respect to component tolerances. In spite of this, a wake-up circuit is required on the secondary side, in order to "wake" the regulator on the primary side when the switching converter is in standby mode and a load jump occurs on the output. The mentioned saturation effects are not a problem in digital primary side regulation.

In primary side regulation, the output voltage is measured indirectly via the transformer, the tolerances of the transformer and of the rectifier element coupled thereto in this case influencing the measured value for the output voltage and therefore the accuracy of the regulation. Without calibration, it is possible to achieve accuracies of ±5% in the regulation of the output voltage. For some applications, it may be necessary to calibrate the system.

Publication US20180083544A1 describes a flyback converter in which the setpoint value for the output voltage to be generated is determined by way of a reference voltage determination module by the load supplied by the switching converter (for example by way of communication over a universal serial bus). Publication DE102011005270A1 relates to a method and a device for calibrating switching converters by way of an external test system.

In switched-mode power supplies having variable output voltage, such as for example power adapters in accordance with the USB-PD (Universal Serial Bus Power Delivery) standard, the information about the actual setpoint value of the output voltage is usually determined by the connected load (for example a mobile device). This information may be transmitted to the primary side (in the case of primary side regulation) via a further galvanically isolating component (for example a further optocoupler). The additional galvanic isolation in the transmission path for the setpoint value information brings about additional costs. The mentioned calibration also leads to higher costs. The object on which the invention is based can therefore be considered that of providing a switching converter that is inexpensive to manufacture.

EMBODIMENTS

A switched-mode power supply is described below. According to one exemplary embodiment, the switched-mode power supply has a switching converter that is designed to receive an input voltage and to convert this into an output voltage in accordance with a switching signal. The switching converter has a transformer in order to provide galvanic isolation between a primary side and a secondary side of the switching converter. The switched-mode power supply furthermore has a wake-up circuit connected to the secondary side of the switching converter, which wake-up circuit is coupled to the secondary side of the switching converter and designed to generate a feedback signal that indicates whether the output voltage is greater than or equal to a threshold value. The switched-mode power supply furthermore has a primary side regulator that is designed to generate a control signal depending on a reference value and a measured value representing the output voltage, and a primary side logic circuit that is designed to generate the switching signal depending on the control signal. A tracking unit contained in the switched-mode power supply is designed to receive the feedback signal via a galvanically isolating component and to adjust the reference value on the basis of the feedback signal.

A method for a switched-mode power supply is furthermore described. According to one exemplary embodiment, the method comprises driving a switching converter with a switching signal, such that an input voltage of the switching converter is converted into an output voltage. The switching converter has a transformer in order to provide galvanic isolation between a primary side and a secondary side of the switching converter. The method furthermore comprises regulating the output voltage by way of a regulator arranged on the primary side that generates a control signal depending on a reference value and a measured value representing the output voltage, and generating the switching signal for the switching converter depending on the control signal. The method furthermore comprises generating a feedback signal that indicates whether the output voltage is greater than or equal to a threshold value, and transmitting the feedback signal via a galvanically isolating component. The reference value is adjusted on the basis of the feedback signal.

BRIEF DESCRIPTION OF THE DRAWINGS

Exemplary embodiments are explained in more detail below with reference to drawings. The illustrations are not necessarily true to scale and the exemplary embodiments are not restricted just to the aspects that are illustrated. Rather, value is attached to illustrating the principles underlying the exemplary embodiments. In the drawings.

DETAILED DESCRIPTION

Figure 1:
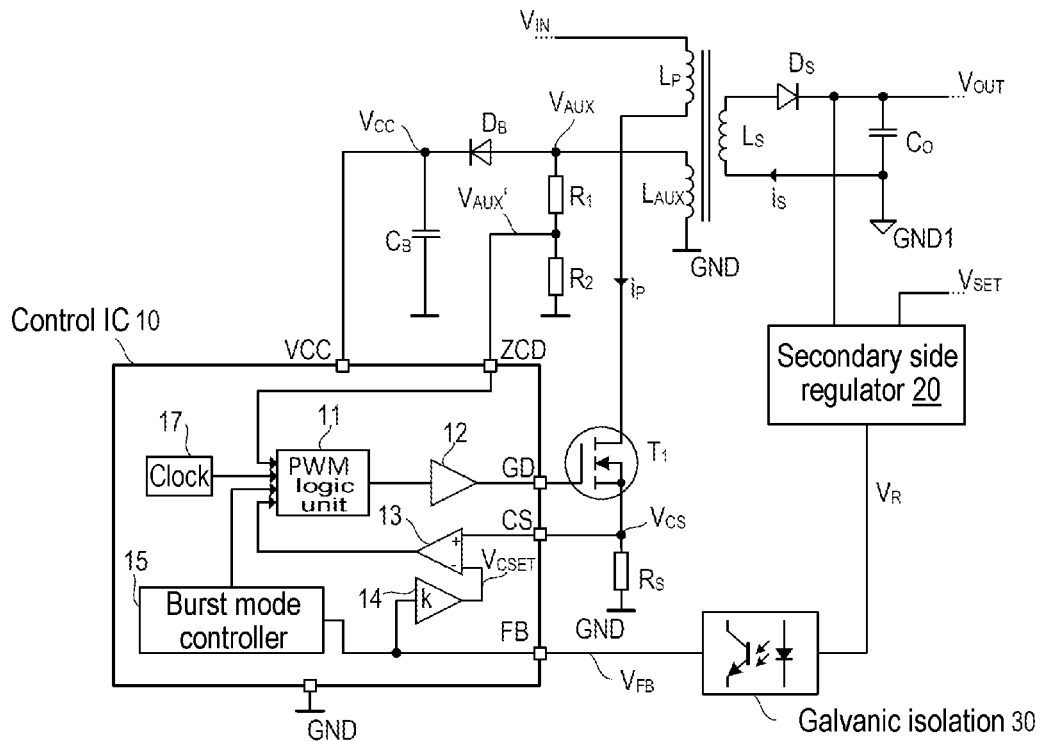
FIG. 1 is a block circuit diagram of one example of a flyback converter with secondary side regulation (SSR) according to embodiments herein.

FIG. 1 1 illustrates the concept of a switching converter with secondary side regulation (SSR), using the example of a flyback converter. This concept may also be transferred to other switching converter topologies. In the example illustrated, the switching converter has a transformer with a primary winding $L_P$ ($N_{PRI}$ windings), a secondary winding $L_S$ ($N_{SEC}$ windings) and an auxiliary winding $L_{AUX}$ ($N_{AUX}$ windings). All circuit components that are coupled to the secondary winding $L_S$ without galvanic isolation between them are situated on the secondary side. Likewise, all circuit components that are coupled to the primary winding $L_P$ without galvanic isolation between them are situated on the primary side. No circuit component on the primary side has a direct electrical connection (without galvanic isolation) to a circuit component on the secondary side.

An electronic switch $T_1$ (for example a transistor) is connected in series with the primary winding $L_P$ such that the primary current $i_P$ through the primary winding $L_P$ also flows through the electronic switch $T_1$, as long as it is switched on. A current measurement circuit, which is designed to provide a current measurement signal (or current sense signal), may be coupled to the transistor $T_1$ or to the primary winding $L_P$. In the present example, the current measurement circuit has a simple resistor $R_S$, which is connected in series with the electronic switch $T_1$, and the current measurement signal is the voltage drop $V_{CS}=i_P \cdot R_S$ across the resistor $R_S$. The input voltage $V_{IN}$ is present at the series circuit consisting of primary winding $L_P$, switch $T_1$ and resistor $R_S$. In the example illustrated, the primary winding $L_P$ is connected to an input node at which the input voltage $V_{IN}$ is present during operation. The electronic switch $T_1$ is connected between the primary winding $L_P$ and the resistor $R_S$, and a terminal of the resistor $R_S$ is connected to a circuit node GND at which a reference potential (for example ground potential) is present during operation.

The current measurement signal $V_{CS}$ is fed to a controller 10 (input pin CS), which may be implemented for example as an integrated control circuit (control IC). The controller 10 is designed to generate a driver signal for switching on and switching off the electronic switch $T_1$ depending on a setpoint value and the current measurement signal $V_{CS}$ and to make this available on the output pin GD. The driver signal may be for example a gate voltage if a MOS transistor is used as electronic switch. A voltage signal $V_{AUX}'$, which represents the voltage $V_{AUX}$ across the auxiliary winding $L_{AUX}$ is furthermore fed to the controller (on the input pin ZCD). In the present example, this voltage signal is generated by a resistive voltage divider (resistors $R_1$ and $R_2$), which divides the voltage $V_{AUX}$ according to the resistor ratio $R_1/R_2$ ($V_{AUX}'=V_{AUX}/(1+R_1/R_2)$). The further processing of the voltage signal $V_{AUX}'$ is described in even more detail further on (see also FIG. 5).

A supply circuit, which comprises for example a diode $D_B$ and a capacitor $C_B$, is also situated on the primary side. The diode $D_B$ serves as rectifier element, and the series circuit consisting of the diode $D_B$ and the capacitor $C_B$ is connected to the auxiliary winding $L_{AUX}$ such that the voltage $V_{AUX}$ is present at this series circuit. When $V_{AUX}$ is sufficiently positive, a voltage $V_{AUX}-V_F$ is present on the capacitor $C_B$, and the capacitor $C_B$ is charged ($V_F$ denotes the flow voltage of the diode $D_B$). The capacitor voltage on the capacitor $C_B$ is also denoted by VCC and is fed, as supply voltage, to the controller on the supply pin VCC. The controller is furthermore connected to the circuit node GND (ground).

In addition to the secondary winding $L_S$, essentially a rectifier element (for example a diode $D_S$) and an output capacitor $C_O$ are situated on the secondary side. The diode $D_S$ is connected between the secondary winding $L_S$ and an output node on which the output voltage $V_{OUT}$ is provided. The diode $D_S$ is designed to rectify the secondary current $i_S$, and the rectified secondary current charges the output capacitor $C_O$, which is connected between the output node and the ground node GND1, to which the secondary winding $L_S$ is also connected. It is understood that the ground node GND on the primary side and the ground node GND1 on the secondary side do not have any galvanic connection, and the electrical potentials of the ground nodes GND and GND1 may float in relation to one another. That is to say, the potential on the node GND1 is floating.

In the example illustrated in FIG. 1, a voltage regulator is arranged on the secondary side (secondary side regulator 20). The output voltage $V_{OUT}$ and a setpoint value $V_{SET}$ are fed to the secondary side regulator 20, and the secondary side regulator 20 is designed, in accordance with a regulator characteristic, to generate a regulator output signal $V_R$ that is fed to the controller 10 (input pin FB) on the primary side via the galvanically isolating component 30 (for example optocoupler).

The implementation of the controller 10 (control IC) is illustrated in simplified form in FIG. 1, since the basic functions of such a controller are known per se. In the present example, the electronic switch $T_1$ is driven by a pulse width-modulated driver signal (pulse width modulation, PWM). The PWM logic unit 11 generates a pulse width-modulated signal (PWM signal), which is fed to a driver circuit 12. The driver circuit 12 converts the logic level of the PWM signal (high and low level) into a corresponding driver signal with signal levels that are suitable for switching the switch $T_1$ on and off. The PWM logic unit 11 is fed with a clock signal that is generated by a clock generator 17. The clock generator 17 may be for example a simple relaxation oscillator, and the frequency of the clock signal determines the carrier frequency of the PWM signal generated by the PWM logic unit 11. The electronic switch $T_1$ is regularly switched on in accordance with the clock signal. In what is known as current mode regulation, the electronic switch $T_1$ is regularly switched off upon reaching a predefined peak current value. A switch-on time is triggered for example by a rising edge of the PWM signal. The switch-off time of the electronic switch $T_1$ is variable and is triggered by way of the comparator 13, which is designed to compare the current measurement signal $V_{CS}$ with a variable current setpoint value $V_{CSET}$ (control signal for the PWM modulator that is formed by the comparator 13 and the PWM logic unit 11); as soon as the current measurement signal $V_{CS}$ reaches or exceeds the current setpoint value $V_{CSET}$ ($V_{CS} \geq V_{CSET}$), the PWM logic unit 11 generates a falling edge in the PWM signal, by way of which switching off of the electronic switch $T_1$ is triggered. The variable current setpoint value $V_{CSET}$ depends on the output signal of the secondary side regulator 20. In the present example, the regulator output signal $V_R$ transmitted via the optocoupler 30 to the control IC 10 is amplified (amplifier 14), and the variable current setpoint value $V_{CSET}$ is substantially proportional to the regulator output signal $V_R$. As mentioned, such an operating mode is known per se as current mode regulation, and is therefore not described in more detail here.

In some situations, the switch-on time of the electronic switch $T_1$ is not controlled by the clock signal generated by the clock generator 17, but rather dependent on the level of the voltage signal $L_{AUX}$. This mode of operation is known per se as "quasi-resonant operation" and is therefore not described in more detail. In the case of a low load, or in the event that no load is present at the output of the voltage converter, the electronic switch $T_1$ is switched off for a comparatively long time and is only activated again in the event that the output voltage has dropped below a particular threshold value. For recharging purposes, the electronic switch is driven with a short series of pulses (what is known as a burst). This what is known as burst mode (burst mode controller 15) is known per se and is therefore not described in more detail.

Figure 2:
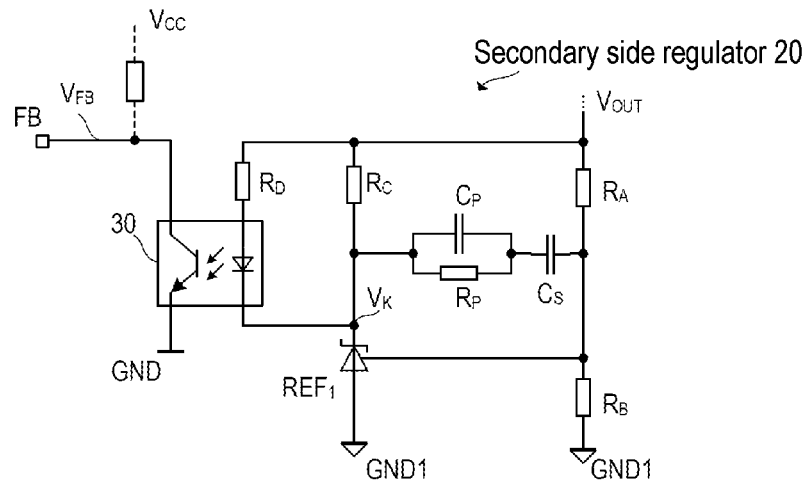
FIG. 2 shows one exemplary implementation of the secondary side regulator according to embodiments herein.

FIG. 2 shows a simple exemplary implementation of a secondary side regulator 20, the setpoint value $V_{SET}$ being able to be predefined by the internal reference voltage of a reference component $REF_1$. The reference component $REF_1$ may be for example an integrated programmable precision reference, such as for example the TL431 component, which is provided by Texas Instruments or ON-Semiconductor. The reference input of the reference component $REF_1$ is connected to the center tap of a voltage divider (resistors $R_A$ and $R_B$), which divides the output voltage $V_{OUT}$. The reference component $REF_1$ behaves in a manner substantially similar to a Zener diode (the load terminals of the reference component $REF_1$ are therefore also referred to as anode and cathode); as soon as the voltage $V_{OUT}/(1+R_A/R_B)$) is greater than the internal reference voltage of the reference component $REF_1$ (for example 2.5 V), the reference component $REF_1$ becomes conductive (similarly to a Zener diode in an avalanche breakdown). The anode of the reference component $REF_1$ is connected to ground GND1 and the cathode is connected to the output of the switching converter via the resistor $R_C$. The output voltage is thus present at the series circuit of the resistor $R_C$ and the reference component $REF_1$. The voltage $V_K$ across the reference component $REF_1$ is therefore substantially equal to the output voltage $V_{OUT}$, if the voltage $V_{OUT}/(1+R_A/R_B)$) is smaller than the internal reference voltage of the reference component $REF_1$ (current through the reference component $REF_1$ approximately zero). In this situation, no current flows through the LED of the optocoupler 30 and the series resistor $R_D$, the output transistor of the optocoupler 30 is not conductive, and the output voltage $V_{FB}$, fed back to the controller 10, of the optocoupler 30 is pulled up to the supply voltage $V_{CC}$ by a pull-up resistor (for example integrated in the controller) (and the duty cycle of the PWM signal is high).

If the voltage $V_{OUT}/(1+R_A/R_B)$) is greater than the internal reference voltage of the reference component $REF_1$ (current through the reference component $REF_1$ greater than zero), the voltage $V_K$ across the reference component $REF_1$ drops and the LED of the optocoupler 30 is supplied with current, and the output transistor of the optocoupler 30 becomes conductive. Current flows through the pull-up resistor and the voltage level of the fed back signal $V_{FB}$ drops (and the duty cycle of the PWM signal likewise drops). The voltage $V_{FB}$ substantially represents the regulator output voltage (denoted by $V_R$ in FIG. 1). By virtue of this feedback mechanism, the output voltage $V_{OUT}$ is able to be regulated to a value that substantially corresponds to the internal reference voltage of the reference component $REF_1$ times the factor $1+R_A/R_B$. The RC circuit comprising the parallel circuit consisting of the capacitor $C_P$ and the resistor $R_P$ and the series capacitor $C_S$ substantially determines the dynamic behavior of the secondary side regulator 20 in the event of load changes.

Figure 3:
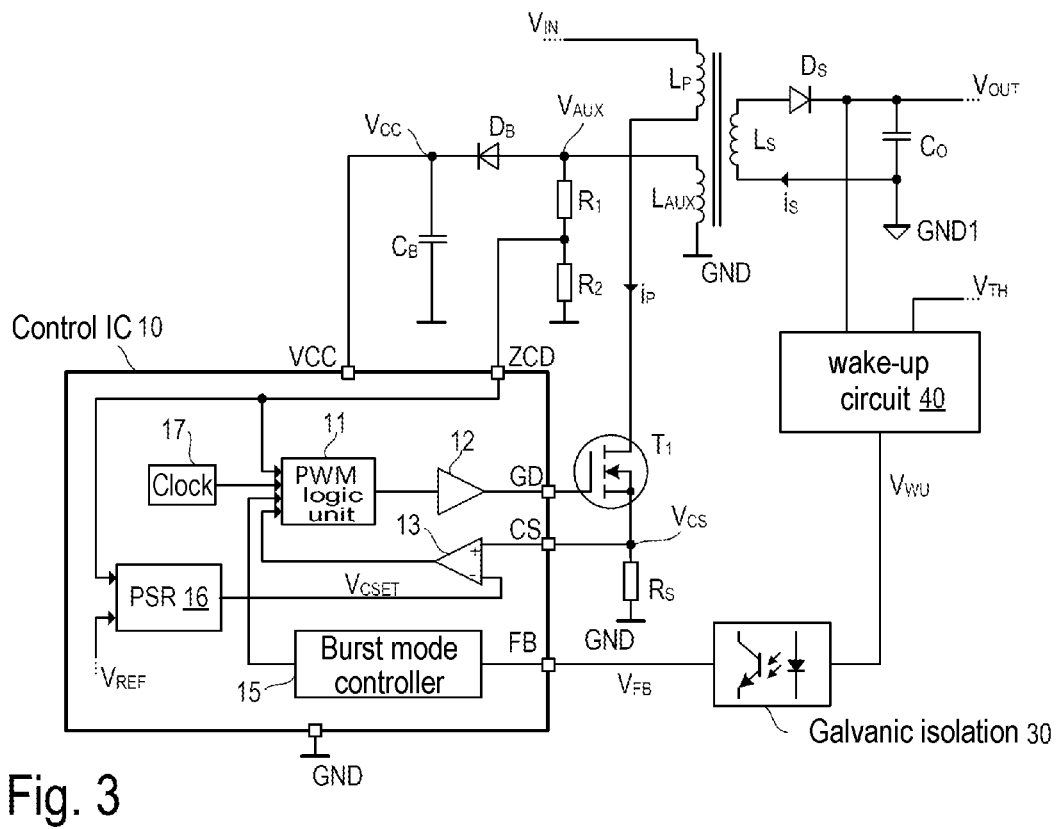
FIG. 3 is a block circuit diagram of one example of a flyback converter with primary side regulation (PSR) and a wake-up circuit on the secondary side according to embodiments herein.

FIG. 3 shows a switching converter with primary side regulation (PSR 16), which may be integrated directly into the controller (control IC 10) arranged on the primary side. Switching converters with primary side regulation do not require an optocoupler or similar galvanically isolating components in some applications. However, in many cases, a wake-up circuit 40 is necessary on the secondary side, since the controller on the primary side or parts thereof is put into a standby mode (also referred to as sleep mode) in the event of very low load, during which the output voltage $V_{OUT}$ is not able to be observed on the primary side and is essentially buffer-stored by the output capacitor $C_O$. The wake-up circuit 40 receives the output voltage $V_{OUT}$ (or a measured value for the output voltage) and a threshold value $V_{TH}$, and is designed to "wake" the controller 10 if the output voltage $V_{OUT}$ drops below the threshold value $V_{TH}$. The output signal $V_{WU}$ of the wake-up circuit 40 is also transmitted in this example via the galvanically isolating component 30 to the primary side, the output signal of the galvanically isolating component 30 being denoted by $V_{FB}$. In the standby mode, the wake-up circuit may trigger the burst mode controller 15 so as to recharge the capacitor $C_O$ if the output voltage $V_{OUT}$ has dropped below the threshold value $V_{TH}$. Apart from the primary side regulator 16 (instead of a secondary side regulator) and the wake-up circuit 40, the example from FIG. 3 is identical to the circuit from FIG.

1, and reference is made to the above description in order to avoid repetitions. The wake-up circuit 40 and the primary side regulator 16 will be described in even more detail below.

Figure 4:
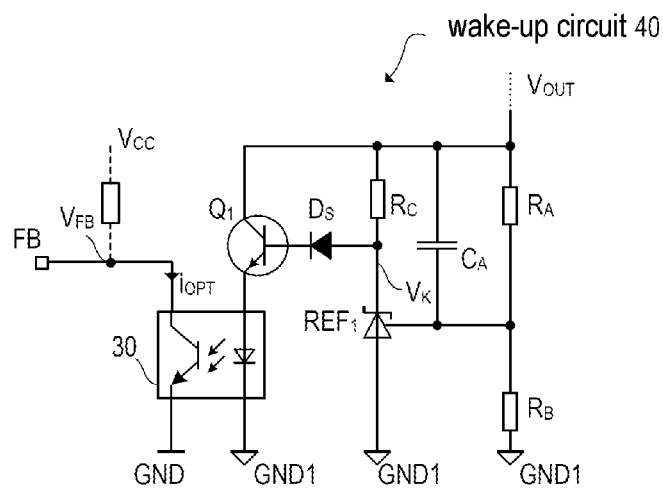
FIG. 4 shows one exemplary implementation of the wake-up circuit according to embodiments herein.

FIG. 4 shows one exemplary implementation of a wake-up circuit with the aid of a reference component $REF_1$, which, as in the example of FIG. 2, may be an integrated programmable precision reference, such as for example the TL431 component. Similarly to the example from FIG. 2, the reference input of the reference component $REF_1$ is driven via a voltage divider (resistors $R_A$ and $R_B$), such that the voltage $V_{OUT}/(1+R_A/R_B)$, which is proportional to the output voltage $V_{OUT}$, is present on the reference input. If the voltage $V_{OUT}/(1+R_A/R_B)$ is greater than the internal reference voltage of the reference component $REF_1$ (corresponds to the state $V_{OUT}>V_{TH}$), then the reference component $REF_1$ is conductive and the cathode voltage $V_K$ on the reference component $REF_1$ drops due to the voltage drop on the series resistor $R_C$ to a value that is small enough to switch off the transistor $Q_1$. The base of the transistor $Q_1$ is in this case connected to the cathode of the reference component $REF_1$ (via the diode $D_S$), and the emitter is connected to the LED of the optocoupler 30 (that is to say the emitter current also flows through the LED). The output transistor of the optocoupler 30 is off in this situation and the current $i_{OPT}$ is approximately zero and the signal $V_{FB}$ fed back to the controller rises to a high level (due to the pull-up resistor). As soon as the voltage $V_{OUT}/(1+R_A/R_B)$ drops below the internal reference voltage of the reference component $REF_1$ (corresponds to the state $V_{OUT}<V_{TH}$), then the reference component $REF_1$ is not conductive, the cathode voltage $V_K$ on the reference component $REF_1$ rises (is pulled up by the resistor $R_C$ to the output voltage $V_{OUT}$) and the transistor $Q_1$ is switched on. The resulting emitter current through the LED results in a corresponding current $i_{OPT}$ through the output transistor, and the signal $V_{FB}$ fed back to the controller drops to a low level. The wake-up circuit essentially operates as a simple comparator that compares the output voltage with the threshold value $V_{TH}$, a state $V_{OUT}<V_{TH}$ being indicated by a low level of the signal $V_{FB}$. It is understood that the implementation illustrated in FIG. 4 is merely one example of many, and many other possibilities exist for implementing the same function.

Figure 5:
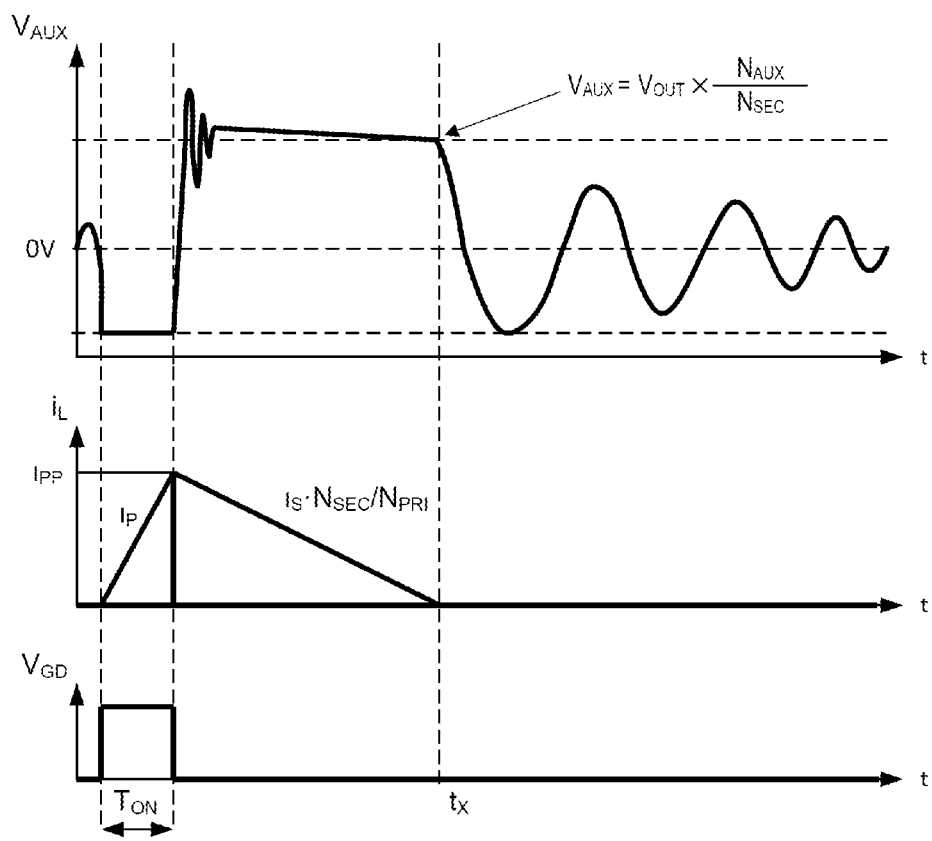
FIG. 5 contains timing diagrams for illustrating the indirect measurement of the output voltage in primary side regulation according to embodiments herein.

FIG. 5 contains timing diagrams with exemplary signal profiles of a PWM-modulated gate signal $V_{GD}$ that drives the electronic switch $T_1$ (bottom diagram in FIG. 5), of the resulting coil current $i_L$, (middle diagram in FIG. 5) and the resulting voltage $V_{AUX}$ on the auxiliary winding $L_{AUX}$ (upper diagram in FIG. 5). The switch-on time $T_{ON}$ of the PWM-modulated gate signal $V_{GD}$ (and thus the switch-on time of the transistor $T_1$) is determined indirectly by the (primary side) regulator 16, since it generates the control signal $V_{CSET}$ that determines the maximum value for the current measurement signal $V_{CS}$, and thus predefines it for the coil current $i_P$ in the primary winding. During the switch-on time $T_{ON}$, the transistor $T_1$ is conductive and the current $i_P$ in the primary winding increases approximately linearly until the peak value, predefined by the maximum value $V_{CSET}$, of the current $i_{PP}$ is reached and the transistor $T_1$ is switched off. When the transistor $T_1$ is switched off, primary current is no longer able to flow and the energy stored in the transformer is transmitted to the secondary side, and the secondary current $i_S$ through the secondary winding drops, beginning at a maximum value, to zero, and in the process charges the output capacitor $C_O$.

During the switch-on time, the voltage $V_{AUX}$ on the auxiliary winding $L_{AUX}$ is negative, and during the switch-off time it is positive, as long as the secondary current $i_S$ flows. If the secondary current has dropped to zero (see FIG. 5, time $t_X$), the voltage $V_{AUX}$ is approximately $V_{OUT} \cdot N_{AUX}/N_{SEC}$; the voltage $V_{AUX}$ at the time $t_X$ is thus proportional to the output voltage, and may be used as measured value for the output voltage. By way of example, the voltage $V_{AUX}$ may be sampled and digitized. After the time $t_X$, the voltage $V_{AUX}$ begins to oscillate. Indirectly measuring the output voltage $V_{OUT}$ by measuring the voltage $V_{AUX}$ on the auxiliary winding $L_{AUX}$ is known per se and is therefore not described in more detail. The (for example digital) measured value for the output voltage $V_{OUT}$ may accordingly be determined on the primary side and does not have to be transmitted via a galvanically isolating component. The measured value may be fed to the primary side regulator 16 (see FIG. 3), which defines the maximum value $V_{CSET}$ for the primary current and therefore, indirectly, the duty cycle depending on the measured output voltage $V_{OUT}$ and a reference value $V_{REF}$. In the case of a digital implementation of the primary side regulator 16, the reference value $V_{REF}$ may likewise be a digital value (for example a 12-bit word). The reference value $V_{REF}$ determines the setpoint value $V_{SET}$ of the voltage regulation. The reference value is thus set such that the desired setpoint value $V_{SET}$ is used.

Figure 6:
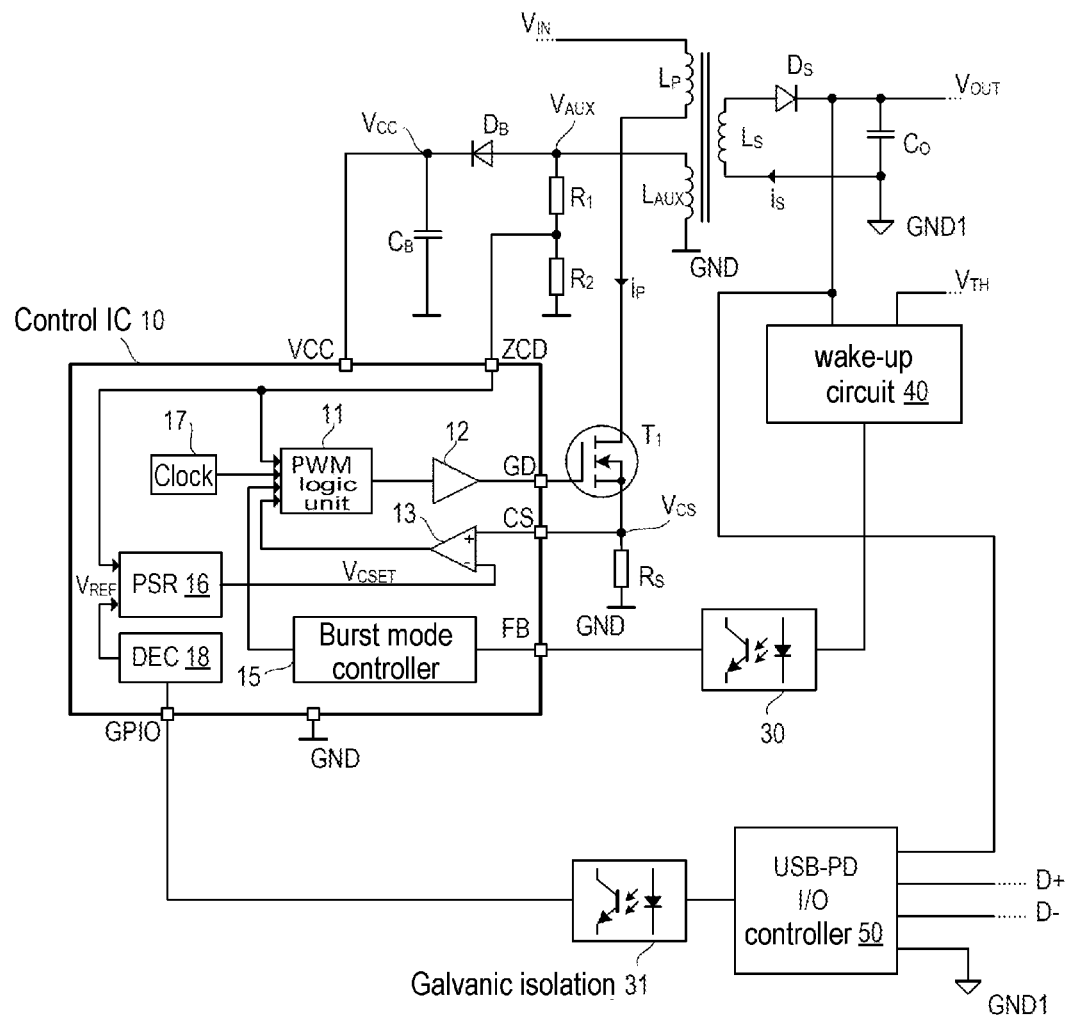
FIG. 6 is a block circuit diagram of one example of a flyback converter that is designed similarly to the example from FIG. 4, and additionally has a galvanically isolating transmission path for the transmission of setpoint value information to the primary side according to embodiments herein.

As mentioned at the outset, the output voltage $V_{OUT}$ is variable in some applications. It is possible to change the output voltage $V_{OUT}$ (for example from 5 V to 12 V) by changing the reference value $V_{REF}$ used for the voltage regulation in accordance with the desired setpoint value $V_{SET}$ for the output voltage $V_{OUT}$. FIG. 6 shows one example of a switched-mode power supply with settable output voltage, as may be used for example in power adapters in accordance with the USB-PD standard. An input/output (I/O) controller 50 on the secondary side is designed to receive a request from the load connected to the power adapter (for example a mobile telephone, not illustrated in FIG. 6), via the USB bus (lines D+ and D−), to set a particular output voltage $V_{OUT}$. The received request is transmitted to the controller 10 on the primary side via a second galvanically isolating component 31, and fed to a decoding unit 18 (for example integrated in the controller). The decoding unit 18 is designed to decode the request and to adjust the setpoint value $V_{SET}$ (and the reference value $V_{REF}$ used for the regulation) for the primary side regulator 16. In practice, the reference value $V_{REF}$ is a digital word stored in a register. Apart from the components that are used to adjust the setpoint value $V_{SET}$ (and therefore also the reference value $V_{REF}$) (decoding unit 18, optocoupler 31, USB I/O controller 50), the example from FIG. 6 is identical to the example from FIG. 3, and reference is thus made to the associated explanations further above.

As is able to be seen in the example from FIG. 6, to select the setpoint value $V_{SET}$ for the output voltage, a further galvanically isolating component (for example optocoupler 31) is required in order to transmit the information about the desired setpoint value $V_{SET}$ from the load coupled to the secondary side to the controller 10 arranged on the primary side. Furthermore, the accuracy that is able to be achieved using the voltage regulation without calibration is restricted to a few percent (circa ±5%), because indirectly measuring the output voltage $V_{OUT}$ (by measuring the voltage $V_{AUX}$, see FIG. 5) depends on the tolerances of the transformer and the diode $D_S$, which leads to systematic errors in the measurement. One possibility of calibrating the voltage regulation consists in adjusting the reference value $V_{REF}$ such that the regulator 16 regulates the output voltage with the desired accuracy. Such adjustment may eliminate the mentioned systematic errors.

Figure 7:
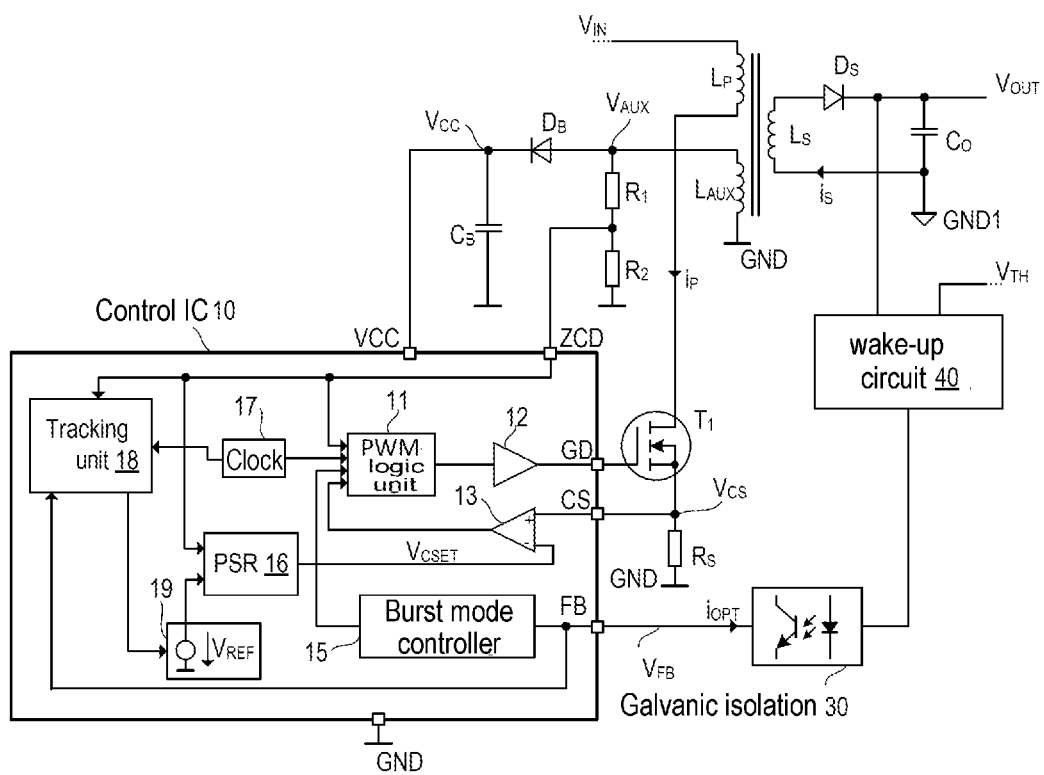
FIG. 7 is a block circuit diagram of a first exemplary embodiment in which the controller has a primary side regulator and a setpoint value tracking unit according to embodiments herein.

FIG. 7 uses a block circuit diagram to illustrate one exemplary embodiment of a switched-mode power supply with a wake-up circuit 40 on the secondary side and a setpoint value tracking unit 18, which may be integrated for example in the controller 10. Apart from the additional tracking unit 18 and the adjustable reference value $V_{REF}$ (switching component 19), the example from FIG. 7 is identical to the previous example from FIG. 3, and reference is made to the above explanations. The tracking unit 18 is designed to adjust the reference value $V_{REF}$ that is used for the voltage regulation (primary side regulator 16) on the basis of the signal generated by the wake-up circuit 40. Tolerances (that is to say systematic errors) when indirectly measuring the output voltage $V_{OUT}$ are thus able to be compensated (calibration). The tracking unit 18 also makes it possible to dispense with the additional transmission of the setpoint value information from the secondary side to the primary side (cf. FIG. 6, optocoupler 31), but this will be explained later with reference to FIGS. 10 and 11.

The wake-up circuit 40 is always active (not just in standby mode). The voltage $V_{FB}$ fed back by the wake-up circuit 40 via the optocoupler 30 (feedback signal) is essentially a binary signal (with the states high and low) that indicates whether or not the output voltage $V_{OUT}$ is smaller than a threshold value $V_{TH}$. Since the threshold value is determined by a comparatively accurate reference (cf. FIG. 4, reference component $REF_1$), the condition $V_{OUT} < V_{TH}$ in the wake-up circuit 40 on the secondary side is able to be evaluated comparatively accurately (more accurately than indirectly measuring the output voltage $V_{OUT}$ on the primary side). The tracking unit 18 is designed to increase the reference value $V_{REF}$ for the voltage regulation for as long as the feedback signal $V_{FB}$ indicates that the output voltage $V_{OUT}$ is too low, and to reduce the reference value $V_{REF}$ for as long as the feedback signal $V_{FB}$ indicates that the output voltage $V_{OUT}$ is too high. The reference value $V_{REF}$ may be adjusted in steps in each clock cycle. To this end, the tracking unit 18 may be clocked by way of the clock generator 17 (at a fixed clock frequency) or using the signal $V_{AUX}'=V_{AUX} \cdot R_2/(R_1+R_2)$ received from the auxiliary winding $L_{AUX}$ on the pin ZCD (in quasi-resonant operation).

Figure 8:
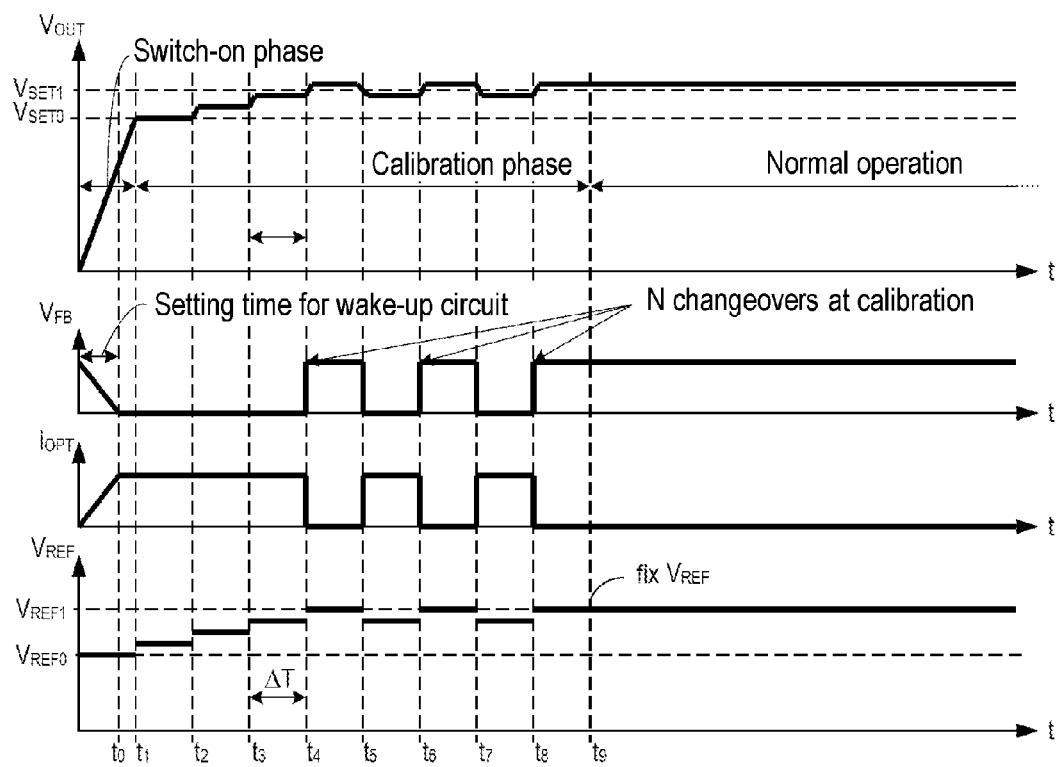
FIG. 8 contains timing diagrams for illustrating the function of a first exemplary implementation of the setpoint value tracking unit according to embodiments herein.

The function of the tracking unit 18 is described in more detail below with reference to the timing diagrams from FIGS. 8 and 9. FIG. 8 contains the signal profiles of the output voltage $V_{OUT}$ (first/top diagram), of the feedback signal $V_{FB}$ (second diagram), of the photocurrent $i_{OPT}$ through the output transistor in the optocoupler 30 (third diagram) and the reference value $V_{REF}$ (fourth/bottom diagram). When the switched-mode power supply is switched on (for example when a power adapter is plugged into a socket), a switch-on phase begins, which lasts until the time $t_1$ in the illustration according to FIG. 8. At this time, the output voltage $V_{OUT}$ has increased from zero to an initial setpoint value $V_{SET0}$. This initial setpoint value $V_{SET0}$ results from an initial reference value $V_{REF0}$ that the regulator 16 uses for the voltage regulation. During this switch-on phase, the wake-up circuit 40 (see FIG. 7), which is supplied by the increasing output voltage $V_{OUT}$, also starts up. In the switch-on phase, the output voltage $V_{OUT}$ is still too low ($V_{OUT} < V_{TH}$), which the wake-up circuit indicates (after a settling time $t_0$) through a photocurrent $i_{OPT} > 0$ and a low level of the feedback signal $V_{FB}$ (cf. explanations with regard to FIG. 3).

The initial reference value $V_{REF0}$ and therefore also the initial setpoint value $V_{SET0}$ may be selected such that, at the end of the switch-on phase at the time $t_1$, the output voltage $V_{OUT}$ is still (slightly) smaller than the threshold value $V_{TH}$ used in the wake-up circuit 40. As a result, the tracking unit 18 increases the reference value $V_{REF}$ used by the voltage regulator 16 in steps, starting from $V_{REF0}$, until the wake-up circuit 40 indicates that the output voltage $V_{OUT}$ has reached the threshold value $V_{TH}$ (that is to say the feedback signal changes from low to high). In the example illustrated, the reference value $V_{REF}$ is increased to the value $V_{REF1}$ at the times $t_1$, $t_2$, $t_3$ and $t_4$ (corresponds to an output voltage setpoint value $V_{SET1}$), the feedback signal $V_{FB}$ indicating, at the time $t_4$ (or shortly thereafter), through a high level, that the actual output voltage $V_{OUT}$ has reached or exceeded the threshold value $V_{TH}$. The time intervals $\Delta T$ between the times $t_1$ and $t_2$, $t_2$ and $t_3$, $t_3$ and $t_4$, etc. may be constant and defined by the circuit design or be defined by way of the software (firmware) executed by the controller 10.

After a further time interval $\Delta T$ has passed (at the time $t_5$), the tracking unit 18 reduces the reference value $V_{REF}$, and the feedback signal $V_{FB}$ changes back to a low level (which indicates $V_{OUT} < V_{TH}$). In the next step (at the time $t_6$), the reference value $V_{REF}$ is increased back up to $V_{REF1}$. As illustrated in FIG. 8, this calibration phase leads into a kind of limit cycle (that is to say toggling of the feedback signal $V_{FB}$), which is ended in that, following N "changeovers" of the feedback signal (beginning after the switch-on phase at the time $t_1$), the reference value $V_{REF}$ is fixed at the value $V_{REF1}$. The setpoint value for the output voltage $V_{OUT}$ is therefore also defined at the value $V_{SET1}$. It is emphasized at this juncture that the fixed setpoint value $V_{SET1}$ (and also the fixed reference value $V_{REF1}$) is determined by the threshold value $V_{TH}$ of the wake-up circuit 40. This threshold value $V_{TH}$ may—as in the example from FIG. 3—be predefined by a precise reference component. The tracking unit 18 therefore makes it possible twofold: firstly to set the reference value $V_{REF}$ (and therefore the setpoint value $V_{SET}$) on the primary side on the basis of a value $V_{TH}$ that is defined on the secondary side (for example by the reference component $REF_1$ and the voltage divider $R_A$, $R_B$, see FIG. 3), and, secondly, to calibrate the reference value $V_{REF}$ (and therefore the setpoint value $V_{SET}$) so as to compensate systematic errors when indirectly measuring the output voltage $V_{OUT}$ (by measuring the voltage $V_{AUX}$ on the primary side). In this case, no additional galvanically isolating component is required.

Figure 9:
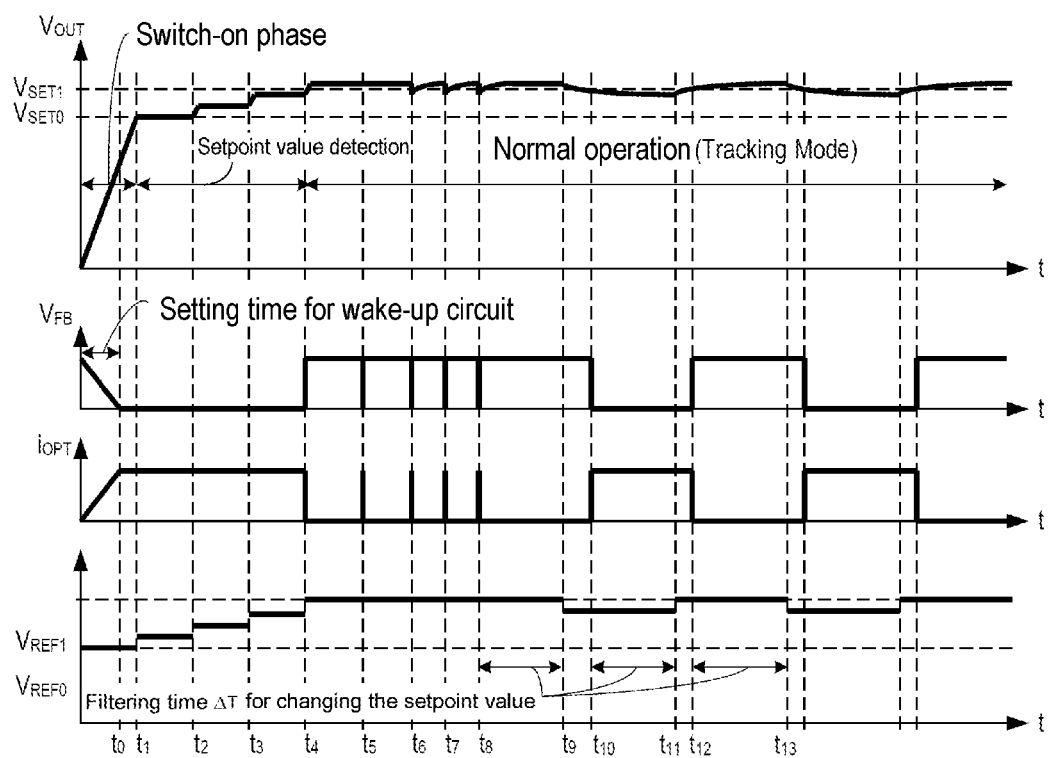
FIG. 9 contains timing diagrams for illustrating the function of a second exemplary implementation of the setpoint value tracking unit according to embodiments herein.

FIG. 9 illustrates, similarly to FIG. 8, a further mode of operation of the tracking unit, which may be implemented in addition or as an alternative to the function explained with reference to FIG. 8. The switch-on phase (until the time $t_1$) and the setpoint value detection phase (until the time $t_4$) is substantially the same as in the example of FIG. 8, and reference is made to the above explanations. At the time $t_4$, the reference value $V_{REF}$ is increased to the value $V_{REF1}$ (corresponds to the output voltage setpoint value $V_{SET1}$) and the feedback signal $V_{FB}$ generated by the wake-up circuit 40 (and transmitted via the optocoupler 30) indicates that the output voltage has reached or exceeded the threshold value $V_{TH}$ ($V_{OUT} \geq V_{TH}$). Unlike in the example from FIG. 8, the reference value $V_{REF}$ is not reduced again (which leads to the toggling illustrated in FIG. 8), but rather remains initially at the set value $V_{REF1}$ until the output voltage changes (for example due to temperature drift or other causes). Noise and the remaining ripple on the output voltage ($V_{OUT}$) may lead to the output voltage $V_{OUT}$ dropping below the threshold value $V_{TH}$ and the wake-up circuit 40 resetting the feedback signal $V_{FB}$ to a low level. In the event that just short disruptions (for example what are known as spikes) are involved, these are suppressed by the tracking unit 18 (for example filtered). Such spikes occur at the times $t_5$, $t_6$, $t_7$ and $t_8$ in the example from FIG. 9. The mentioned suppression/filtering may be achieved for example by taking into account changes in the level of the feedback signal $V_{FB}$ only when they persist for at least a filtering time interval $\Delta T$. Shorter pulses in the signal $V_{FB}$ are ignored. The filtering time interval $\Delta T$ begins again upon each change of level in the feedback signal $V_{FB}$.

In the example illustrated in FIG. 9, no spikes occur in the output voltage $V_{OUT}$ after the time $t_8$ and, after the filtering time interval $\Delta T$ (that is to say at the time $t_9=t_8+\Delta T$) during which the feedback signal $V_{FB}$ is at a high level has expired, the reference value $V_{REF}$ is reduced again by one step. The primary side regulator 18 will react to this, and the output voltage $V_{OUT}$ will drop slightly. At the time $t_{10}$, the output voltage $V_{OUT}$ drops below the threshold value $V_{TH}$, which leads to the wake-up circuit 40 resetting the level of the feedback signal $V_{FB}$ to a low level. After the filtering time interval $\Delta T$ (that is to say at the time $t_{11}=t_{10}+\Delta T$) during which the feedback signal $V_{FB}$ is at a low level has expired, the reference value $V_{REF}$ is increased by one step again to $V_{REF1}$. The primary side regulator 18 reacts again, and the output voltage $V_{OUT}$ increases slightly. At the time $t_{12}$, the output voltage $V_{OUT}$ reaches the threshold value $V_{TH}$ again, which leads to the wake-up circuit 40 setting the level of the feedback signal $V_{FB}$ to a high level. After a further filtering time interval $\Delta T$ (that is to say at the time $t_{13}=t_{12}+\Delta T$) during which the feedback signal $V_{FB}$ is at a high level has expired, the reference value $V_{REF}$ is reduced by one step again, etc. The behavior of the tracking unit 18, shown in FIG. 9 after the time $t_8$ leads to toggling, similar to in FIG. 8. Unlike in the previous example from FIG. 8, the reference value $V_{REF}$ is however not fixed, and the setpoint value $V_{SET}$ tracks the output voltage $V_{OUT}$ if this changes for example due to drift effects. This mode of operation is therefore also referred to as tracking mode.

Figure 10:
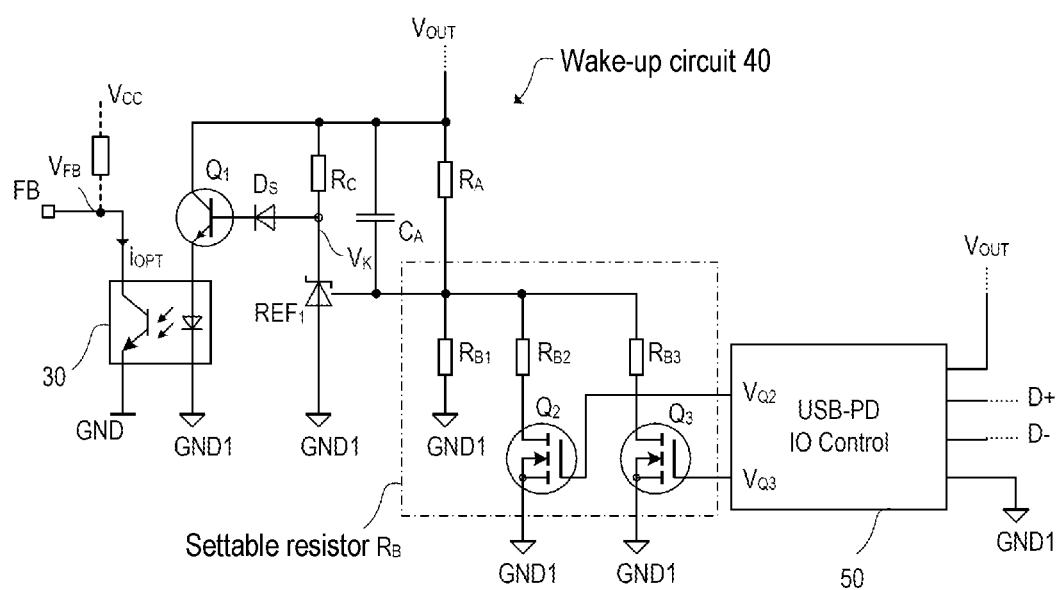
FIG. 10 shows one exemplary implementation of the wake-up circuit for switching converters with a settable setpoint value for the output voltage according to embodiments herein.

The tracking mode described with reference to FIG. 9 is also suitable for variable (settable) output voltages $V_{OUT}$. Upon a change in the setpoint value for the output voltage, no additional transmission path with a galvanically isolating component is therefore necessary (unlike in the example from FIG. 6, in which two transmission paths are used). In order to make it possible to set the output voltage $V_{OUT}$, for example in accordance with the USB-PD standard, only a slight modification of the wake-up circuit is necessary. The example according to FIG. 10 is substantially identical to the example from FIG. 3, with the sole difference that the division ratio of the voltage divider $R_A$, $R_B$ is settable. In the example illustrated, the resistance $R_B$ may be set by virtue of the fact that one or more further resistors $R_{B2}$, $R_{B3}$ may optionally be connected in parallel with the resistor $R_{B1}$. By virtue of the parallel connection of a plurality of resistors, the overall resistance $R_B$ becomes smaller and the division ratio $1:(1+R_A/R_B)$ likewise drops. As a result, the effective threshold value $V_{TH}$, which depends on the internal reference voltage of the reference component $REF_1$ and this division ratio, increases. By way of example, the threshold value $V_{TH}$ of the wake-up circuit may be increased from 5 V to 9 V if a further resistor $R_{B2}$ is connected in parallel with the resistor $R_{B1}$. If the resistor $R_{B3}$ is additionally also connected in parallel, the threshold value $V_{TH}$ of the wake-up circuit 40 may be increased for example to 12 V. In the example illustrated, the parallel connection is achieved through the transistors $Q_2$ and $Q_3$ that are connected in series with the resistors $R_{B2}$ and $R_{B3}$. If the transistor $Q_2$ is switched on (and $Q_3$ is switched off), then the resistance $R_B$ is equal to $(R_{B1}^{-1}+R_{B2}^{-1})^{-1}$. If the transistors $Q_2$ and $Q_3$ are switched on, then the resistance $R_B$ is equal to $(R_{B1}^{-1}+R_{B2}^{-1}+R_{B3}^{-1})^{-1}$. Other types of electronic switch (for example MOS transistors) may also be used instead of the illustrated (bipolar) transistors.

Figure 11:
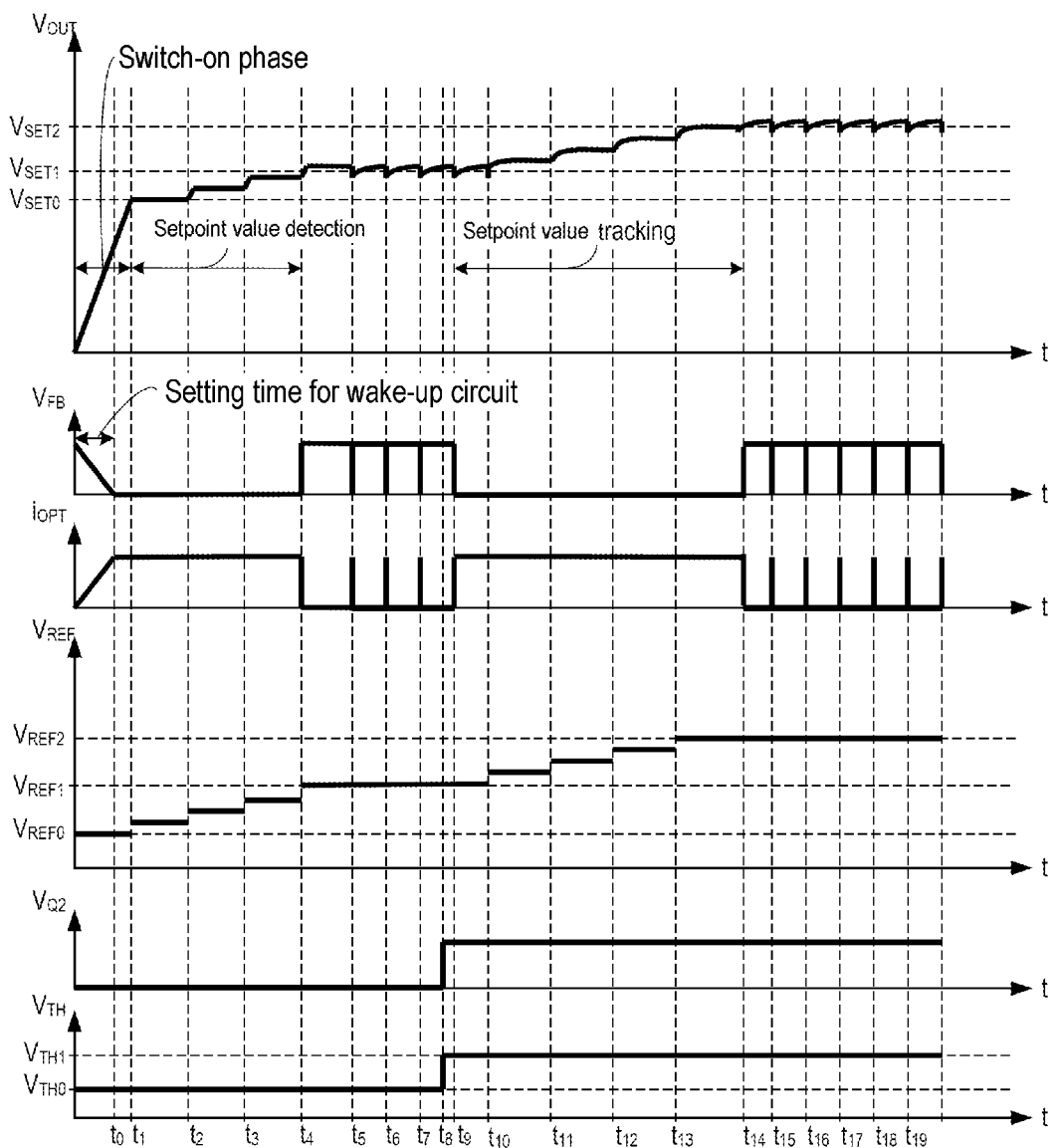
FIG. 11 contains timing diagrams for illustrating how the setpoint value tracking unit reacts to a change in the setpoint value for the output voltage according to embodiments herein.

According to the example from FIG. 10, the threshold value $V_{TH}$ of the wake-up circuit 40 may be set by the USB-PD input/output (I/O) controller 50. The I/O controller may be designed to receive data from the connected load (not illustrated) via a serial bus (data lines D+, D−), which data contain the request for a particular output voltage $V_{OUT}$. The I/O controller 50 may decode this request and set the threshold value $V_{TH}$ of the wake-up circuit 40 in accordance with the requested output voltage $V_{OUT}$ by adjusting the division ratio of the voltage divider $R_A$, $R_B$ (for example by activating/deactivating the transistors $Q_2$ and $Q_3$ by applying suitable control voltages $V_2$ and $V_3$). The information about the requested output voltage $V_{OUT}$ does not have to be transmitted to the controller 10 on the primary side; the tracking unit 18 in the controller 10 is able to react automatically to a changed threshold value $V_{TH}$ of the wake-up circuit 40. This mechanism is illustrated in exemplary form in the timing diagrams of FIG. 11, the first four timing diagrams from FIG. 11 showing the output voltage $V_{OUT}$, the feedback signal $V_{FB}$, the associated photocurrent $i_{OPT}$ and the reference value $V_{REF}$ of the primary side regulator 16 (similarly to in FIGS. 8 and 9). The fourth diagram in FIG. 11 illustrates the control signal $V_{Q2}$ and therefore the switching state of the transistor $Q_2$ (see FIG. 10), and the fifth diagram illustrates the resulting threshold value $V_{TH}$ of the wake-up circuit 40.

In the example illustrated in FIG. 11, the switch-on phase (until time $t_1$) and the setpoint value detection phase (until time $t_4$) is the same as in the examples from FIG. 8 and FIG. 9. The spikes occurring at the times $t_5$, $t_6$ and $t_7$ are suppressed, because the resulting pulses in the feedback signal $V_{FB}$ are shorter than the filtering time $\Delta T$. This behavior has also already been explained with reference to FIG. 9. Until the time $t_8$, the transistors $Q_2$ and $Q_3$ (cf. FIG. 10) are switched off, and the threshold value $V_{TH}$ of the wake-up circuit 40 is at the initial value $V_{TH0}$ (standard value). At the time $t_8$, the switch $Q_2$ is activated, which results in the threshold value $V_{TH}$ of the wake-up circuit 40 increasing to the value $V_{TH1}$. In relation to the higher threshold value $V_{TH}=V_{TH1}$, the output voltage $V_{OUT}$ is too low at this time and the feedback signal $V_{FB}$ changes back to a low level, which indicates the state $V_{OUT}<V_{TH1}$, shortly thereafter (time $t_9$).

The tracking unit 18 reacts to the changed threshold value $V_{TH}=V_{TH1}$ by increasing the reference value $V_{REF}$ (and therefore also the setpoint value $V_{SET}$) for the voltage regulation in steps (times $t_{10}$, $t_{11}$, $t_{12}$, $t_{13}$). The primary side regulator 16 reacts to the rising reference values and regulates the output voltage $V_{OUT}$ to higher values. This process of raising the reference value $V_{REF}$ in steps (that is to say the setpoint value tracking) lasts until the output voltage $V_{OUT}$ has reached or exceeded the new threshold value $V_{TH}=V_{TH1}$ and the feedback signal $V_{FB}$ indicates this through a high level. In the example illustrated, this is the case at the time $t_{14}$. After the time $t_{14}$ (after the setpoint value tracking), normal operation is continued with a changed threshold value $V_{TH}=V_{TH1}$ and an adjusted reference value $V_{REF2}$ (corresponds to the setpoint value $V_{SET2}$), similarly to in FIG. 8 or in FIG. 11 in the time interval between $t_4$ and $t_8$.

Since a plurality of variants have been described as to how the tracking unit 18 is able to adapt/adjust the reference value $V_{REF}$ of the primary side regulator 16, it is once again pointed out that the setpoint value $V_{SET}$, which is directly dependent on the reference value $V_{REF}$, of the voltage regulation should not be confused with the setpoint value $V_{TH}$ used by the wake-up circuit 40. The setpoint value $V_{TH}$ of the wake-up circuit 40 may be defined by the internal reference voltage of a reference component. By way of example, when using a TL431 component, the threshold value $V_{TH}$ is defined by its internal (precise) reference voltage and the connected external components (for example voltage divider $R_A$, $R_B$, see FIG. 10). Since the wake-up circuit 40 is arranged on the secondary side, this has direct access to the output voltage $V_{OUT}$ and is able to evaluate the condition $V_{OUT}$ $V_{TH}$ with comparatively high accuracy. In contrast thereto, in primary side regulation, there may be non-systematic errors in the control loop that are able to be corrected on the primary side by adjusting the reference value $V_{REF}$ (and therefore the setpoint value $V_{SET}$). As described in detail above, the tracking unit may set this reference value $V_{REF}$ on the basis of the feedback signal from the wake-up circuit, such that the resulting setpoint value $V_{SET}$ for the output voltage regulation is set in accordance with the threshold value $V_{TH}$ of the wake-up circuit.

A numerical example is intended to clarify the above explanation. Assuming that the threshold value $V_{TH}$ used by the wake-up circuit 40 is 5 V, the initial reference value $V_{REF}$ is a 12-bit value and equal to 1365 (010101010101 in binary), which corresponds to a setpoint value $V_{SET}$ of 5.0 V. In this example, it is assumed that the analog-to-digital converter used when measuring the output voltage maps a measurement range of 15 V on a 12-bit value (0, . . . , 4095) and the feedback signal adopts a high level for $V_{OUT} \geq 5$ V. The smallest voltage step is in this case 3.67 mV. With these numerical values, the toggling after the time $t_8$, in the example from FIG. 9, would lead to the reference value $V_{REF}$ toggling back and forth between 1365 (corresponds to $V_{SET}$=5.0 V) and 1364 (corresponds to $V_{SET}$=4.996 V). If now, for whatever reason, the control loop of the primary side regulator is affected by a systematic error, the output voltage $V_{OUT}$ will deviate from the setpoint value $V_{SET}$=5 V. By way of example, the output voltage $V_{OUT}$ is only 4.9 V because indirectly measuring the output voltage by way of the voltage $V_{AUX}$ (cf. FIG. 5) entails an error of 2%, such that 5 V are measured, even though the actual output voltage $V_{OUT}$ is only 4.9 V. In this situation, the tracking unit 18 will increase the reference value $V_{REF}$ in steps to the value 1393 (10101110001 in binary, corresponds to $V_{SET}$=5.103 V). The primary side regulator 16 then regulates the output voltage $V_{OUT}$—in theory—to 5.103 V. Taking into account the mentioned 2% measurement error, the actual output voltage is however 5.001 V. As a result, $V_{REF}$ will toggle back and forth between 1393 and 1392.

The above explanation assumes that the primary side regulator 16 is implemented in digital form. The above explanations however apply analogously for an analog implementation. In this case, the reference value $V_{REF}$ may be an analog voltage or current value that is adjusted by the tracking unit 18 on the basis of the feedback signal $V_{FB}$ received from the wake-up circuit 40. If the threshold value $V_{TH}$ of the wake-up circuit 40 is increased from 5 V to 12 V in the above numerical example (for example because the load on the USB has requested a higher voltage), then the feedback signal $V_{FB}$ indicates an excessively low voltage until the tracking unit increases the reference value $V_{REF}$ to 3276 (110011001100 in binary), which corresponds to a setpoint value $V_{SET}$ of 12 V (without systematic errors). Taking into account the 2% measurement error, $V_{REF}$ would increase in steps even up to 3343 (corresponds to $V_{SET}$=12.245 V).

We claim:

1. A switched-mode power supply comprising:
    a switching converter operable to receive an input voltage ($V_{IN}$) and to convert the input voltage into an output voltage ($V_{OUT}$) in accordance with a switching signal ($V_{GD}$), wherein the switching converter includes a transformer providing galvanic isolation between a primary side and a secondary side of the switching converter; and
    a wake-up circuit connected to the secondary side of the switching converter, the wake-up circuit operable to generate a feedback signal ($V_{FB}$) that indicates whether the output voltage ($V_{OUT}$) is greater than threshold value ($V_{TH}$);
    a primary side regulator operable to generate a current setpoint control signal ($V_{CSET}$) depending on a reference value ($V_{REF}$) and a measured value ($V_{AUX}$) representing the output voltage,
    a primary side logic circuit operable to generate the switching signal ($V_{GD}$) depending on the control signal ($V_{CSET}$); and
    a tracking unit operable to receive the feedback signal ($V_{FB}$) via a galvanically isolating component and to adjust the reference value based on the feedback signal ($V_{FB}$) from the wake-up circuit.

2. The switched-mode power supply as in claim 1, further comprising:
    a controller, coupled to the primary side of the switching converter, which includes the regulator and the tracking unit.

3. The switched-mode power supply as in claim 2, wherein the tracking unit is operable to reduce the reference value ($V_{REF}$) if the feedback signal ($V_{FB}$) indicates, for a predetermined time interval ($\Delta T$), that the output voltage ($V_{OUT}$) is greater than or equal to the threshold value ($V_{TH}$), and
    wherein the tracking unit is operable to increase the reference value ($V_{REF}$) if the feedback signal ($V_{FB}$) indicates, for the predetermined time interval ($\Delta T$), that the output voltage ($V_{OUT}$) is smaller than the threshold value ($V_{TH}$).

4. The switched-mode power supply as in claim 3,
    wherein the tracking unit is operable to fix the reference value ($V_{REF}$) after the feedback signal ($V_{FB}$) has changed its state N times in a row and in each case at least the predetermined time interval ($\Delta T$) is present between the state changes, wherein N≥2.

5. The switched-mode power supply as in claim 1,
    wherein, in a switch-on phase, the reference value ($V_{REF}$) has a starting value ($V_{REF0}$) that is set such that the resulting regulated output voltage ($V_{OUT}$) is less than the threshold value ($V_{TH}$).

6. The switched-mode power supply as in claim 5,
    wherein the tracking unit is operable to, after the switch-on phase, increase the reference value ($V_{REF}$) in steps, until the feedback signal ($V_{TH}$) indicates that the resulting regulated output voltage ($V_{OUT}$) is greater than the threshold value ($V_{TH}$).

7. The switched-mode power supply as in claim 1, wherein the threshold value ($V_{TH}$) is settable.

8. The switched-mode power supply as in claim 7, further comprising:

a communication interface arranged on the secondary side, the communication interface operable to receive data that represent a desired output voltage, and to set the threshold value ($V_{TH}$) depending on the received data.

9. The switched-mode power supply as in claim 1, wherein the switching converter has a primary winding ($L_P$), a secondary winding ($L_S$), an auxiliary winding ($L_{AUX}$), and an electronic switch ($T_1$), to which the switching signal ($V_{GD}$) is fed, and is connected to the primary winding ($L_P$).

10. The switched-mode power supply as in claim 1, wherein the regulator is a digital regulator and the reference value ($V_{REF}$) is represented by a digital word.

11. The switched-mode power supply as in claim 1, wherein the tracking unit is operable to reduce the reference value ($V_{REF}$) in response to detecting that the feedback signal ($V_{FB}$) indicates that the output voltage ($V_{OUT}$) is greater than the threshold value ($V_{TH}$); and
wherein the tracking unit is operable to increase the reference value ($V_{REF}$) in response to detecting that the output voltage ($V_{OUT}$) is less than the threshold value ($V_{TH}$).

12. The switched-mode power supply as in claim 1, wherein the tracking unit is operable to repeatedly increase a magnitude of the reference value ($V_{REF}$) over each of multiple control cycles in response to detecting that the feedback signal ($V_{FB}$) indicates that the output voltage ($V_{OUT}$) is less than the threshold value ($V_{TH}$).

13. The switched-mode power supply as in claim 1, wherein the primary side regulator is operable to produce the current setpoint control signal ($V_{CSET}$) based on a comparison of the measured value (Vaux) to the reference value ($V_{REF}$).

14. The switched-mode power supply as in claim 13 further comprising:
a comparator operable to compare an amount of current through a primary winding of the primary side to the current setpoint control signal (Vcset), an output of the comparator used to produce the switching signal (Vgd).

15. The switched-mode power supply as in claim 1, wherein the tracking unit increases a magnitude of the reference voltage (Vref) in response to detecting that the feedback signal from the wake-up circuit indicates that the output voltage is below the threshold value.

16. The switched-mode power supply as in claim 15, wherein the increased magnitude of the reference voltage (Vref) increases a magnitude of the output voltage.

17. The switched-mode power supply as in claim 15, wherein the tracking unit is operable to repeatedly increase a magnitude of the reference value ($V_{REF}$) over each of multiple control cycles in response to detecting that the feedback signal ($V_{FB}$) indicates that the output voltage ($V_{OUT}$) is less than the threshold value ($V_{TH}$).

18. The switched-mode power supply as in claim 1, wherein the tracking unit is operable to switch between increasing a magnitude of the reference value ($V_{REF}$) and decreasing the magnitude of the reference voltage (Vref) depending on a comparison of the output voltage ($V_{OUT}$) to the threshold value ($V_{TH}$).

19. The switched-mode power supply as in claim 1, wherein the measured value (Vaux) is a voltage received from an auxiliary winding of the transformer; and
wherein the tracking unit is operable to generate the reference value (Vref) based on a combination of the feedback signal (Vfb) and the measured value (Vaux) received from the auxiliary winding of the transformer.

20. A method comprising:
driving a switching converter with a switching signal ($V_{GD}$), the switching signal controlling conversion of an input voltage ($V_{IN}$) into an output voltage ($V_{OUT}$), wherein the switching converter includes a transformer operable to provide galvanic isolation between a primary side and a secondary side of the switching converter;
regulating the output voltage ($V_{OUT}$) by way of a regulator arranged on the primary side that generates a current setpoint control signal ($V_{CSET}$) depending on a reference value ($V_{REF}$) and a measured value ($V_{AUX}$) representing the output voltage,
generating the switching signal ($V_{GD}$) for the switching converter depending on the current setpoint control signal ($V_{CSET}$);
generating a feedback signal ($V_{FB}$) that indicates whether the output voltage ($V_{OUT}$) is greater than a threshold value ($V_{TH}$), and
transmitting the feedback signal ($V_{FB}$) via a galvanically isolating component;
adjusting the reference value ($V_{REF}$) based on the feedback signal ($V_{FB}$).

21. The method as in claim 20, wherein adjusting the reference value ($V_{REF}$) comprises:
reducing the reference value ($V_{REF}$) if the feedback signal ($V_{FB}$) indicates, for a predetermined time interval ($\Delta T$), that the output voltage ($V_{OUT}$) is greater than or equal to the threshold value ($V_{TH}$), and
increasing the reference value ($V_{REF}$) if the feedback signal ($V_{FB}$) indicates, for the predetermined time interval ($\Delta T$), that the output voltage ($V_{OUT}$) is less than the threshold value ($V_{TH}$).

22. The method as in claim 21,
wherein the reference value ($V_{REF}$) is fixed after the feedback signal ($V_{FB}$) has changed its state N times in a row and in each case at least the predetermined time interval ($\Delta T$) is present between the state changes, wherein N≥2.

23. The method as in claim 20, further comprising:
in a switch-on phase of the switching converter: setting the reference value ($V_{REF}$) to a starting value ($V_{REF0}$), wherein the starting value ($V_{REF0}$) is set such that the resulting regulated output voltage ($V_{OUT}$) is less than the threshold value ($V_{TH}$).

24. The method as in claim 23, further comprising:
after the switch-on phase of the switching converter: increasing the reference value ($V_{REF}$) in steps, until the feedback signal ($V_{TH}$) indicates that the resulting regulated output voltage ($V_{OUT}$) is greater than the threshold value ($V_{TH}$).

25. The method as in claim 24 further comprising:
setting the threshold value ($V_{TH}$).

26. The method as in claim 25, wherein setting the threshold value ($V_{TH}$) comprises:
receiving data by way of a communication interface arranged on the secondary side, wherein the data represents a desired output voltage; and
setting the threshold value ($V_{TH}$) depending on the received data.

27. The method as in claim 26,
wherein the reference value ($V_{REF}$) is represented by a digital word.

28. The method as in claim 20 further comprising:
feeding the switching signal ($V_{GD}$) to an electronic switch ($T_1$) coupled to a primary winding ($L_P$) of the transformer, the switching signal controlling the primary current ($i_P$) flowing through the primary winding ($L_P$).

29. The method as in claim 28, wherein generating the switching signal ($V_{GD}$) comprises:
   determining a measured value ($V_{CS}$) for the primary current ($I_P$);
   comparing the measured value ($V_{CS}$) for the primary current ($I_P$) with the current setpoint control signal ($V_{CSET}$);
   generating the switching signal ($V_{GD}$) with a level that indicates the switching off of the electronic switch ($T_1$) as soon as the measured value ($V_{CS}$) for the primary current ($I_P$) reaches a value that is determined by the current setpoint control signal ($V_{CSET}$).

* * * * *

UNITED STATES PATENT AND TRADEMARK OFFICE
CERTIFICATE OF CORRECTION

PATENT NO. : 10,727,751 B2
APPLICATION NO. : 16/393237
DATED : July 28, 2020
INVENTOR(S) : Marc Fahlenkamp and Torsten Hinz Page 1 of 1

It is certified that error appears in the above-identified patent and that said Letters Patent is hereby corrected as shown below:

In the Claims

Column 14, Line 18, Claim 1 after the word "than", insert --a--

Column 14, Line 40, Claim 3 after the word "than", delete "or equal to"

Column 16, Line 29, Claim 21 after the word "than", delete "or equal"

Column 16, Line 30, Claim 21 delete the word "to"

Signed and Sealed this
Twenty-second Day of September, 2020

Andrei Iancu
*Director of the United States Patent and Trademark Office*